Jan. 16, 1951        R. H. WUOLLET        2,538,612
BAKERY CAKE TIN RACK
Filed July 26, 1946
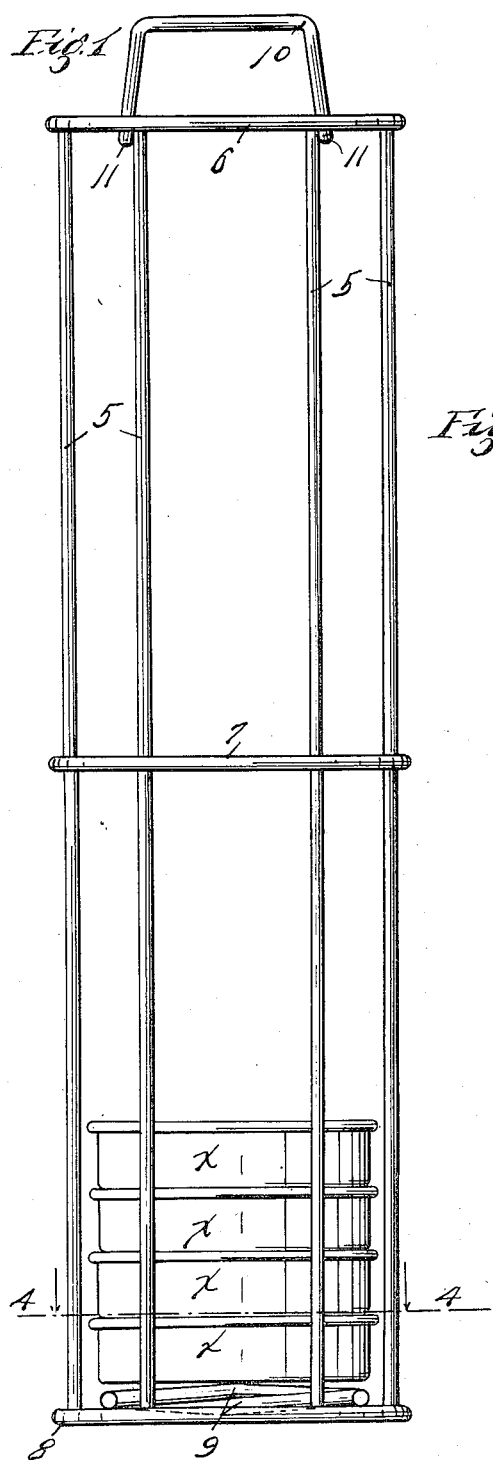
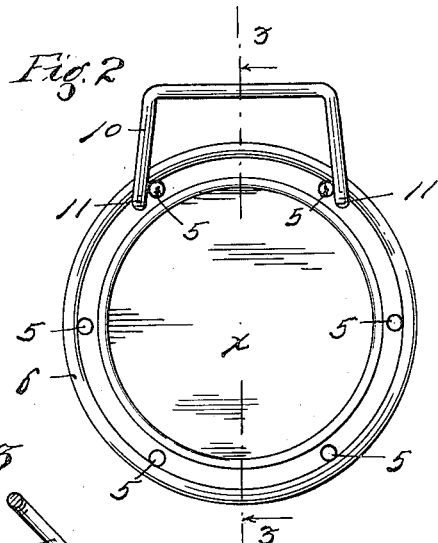
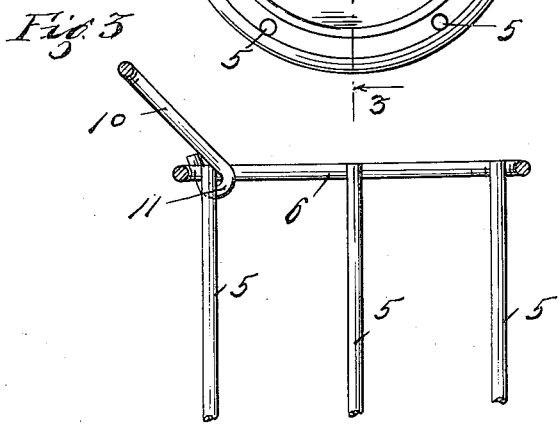
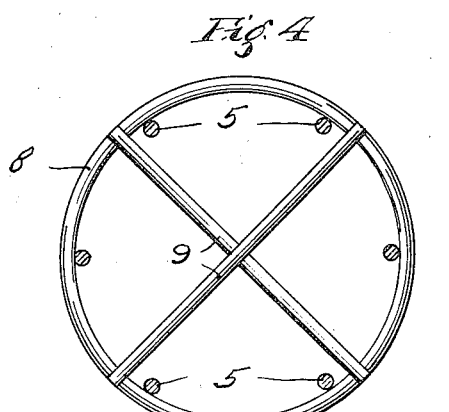
INVENTOR
Reino H. Wuollet
BY Harry D. Kilgore
ATTORNEY Patented Jan. 16, 1951

2,538,612

UNITED STATES PATENT OFFICE 2,538,612

BAKERY CAKE TIN RACK

Reino H. Wuollet, Minneapolis, Minn.

Application July 26, 1946, Serial No. 686,500

1 Claim. (Cl. 224—45)

My invention relates to racks for holding articles in a stack, and, more particularly, for holding bakery tins, especially cake tins.

It is well known that cake tins are relatively shallow, have straight sides and hence will not nest when stacked. Tins having straight sides, when stacked, invariably fall over, thus making it difficult to store or carry the same.

To the above end, generally stated, the invention consists of novel construction and arrangement of parts hereinafter described and defined in the claims.

In the accompanying drawing, which illustrates the invention, like characters indicate like parts throughout the several views.

Referring to the drawing:

Fig. 1 is an elevational view of the improved rack having therein a plurality of bakery cake tins;

Fig. 2 is a plan view of the same;

Fig. 3 is a fragmentary view in section taken on the line 3—3 of Fig. 2; and

Fig. 4 is a sectional view taken on the line 4—4 of Fig. 1.

The rack includes a plurality of upright rods 5 and upper, intermediate and lower rings 6, 7 and 8, respectively. The rods 5 are spaced equidistances apart within the rings 6, 7 and 8 and rigidly secured thereto by welding or otherwise.

The bottom of the rack is formed by a pair of crossed rods 9 that rest, at their end portions, on the lower ring 8 and are rigidly secured thereto by welding or otherwise. Said rods 9 are sprung in opposite directions to pass each other at their point of intersection.

A handle 10 is attached to the upper ring 6. This handle 10 is in the form of a bail bent from a single rod, the end portions of which are bent to form eyes 11 through which the upper ring 6 extends. These eyes 11 encircle the upper ring 6, outwardly of two adjacent rods 5 and thereby hold the handle 10 from moving circumferentially on said ring. The eyes 11 hingedly connect the handle 10 to the upper ring 6 and permit said handle to be turned outwardly of the rack, as shown in Fig. 3, for an important reason, as will hereinafter appear.

Within the rack is a plurality of cake tins $x$ in a stack.

The handle 10, due to its novel attachment to the rack, does not interfere whatsoever in the placing of the tins $x$ in the rack or the removal of the same therefrom. Furthermore, when the handle 10 is turned outwardly of the rack, as shown in Fig. 3, it may be placed over a nail or hook and the rack suspended therefrom.

Obviously, except for the uppermost tins $x$ in the rack, they may be placed in the rack or removed therefrom between any two adjacent rods 5.

In the use of the rack, the tins $x$, as they are greased, may be placed in the rack and removed as needed. Used tins $x$ may be placed in the rack, carried thereby to a sink, dumped therein and when washed, replaced in the rack upside down to drain. The rack affords convenient means for storing and carrying the tins $x$ in a stack.

From what has been said, it will be understood that the invention described is capable of modifications as to details of construction and arrangement within the scope of the invention herein disclosed and claimed.

What I claim is:

A rack of the class described including a plurality of circumferentially spaced long upright round rods, upper, intermediate and lower rings encircling said rods and rigidly secured thereto, the upper ends of the rods being in the plane of the upper side of the upper ring and the lower ends of the rods being in the plane of the lower side of the lower ring, a pair of crossed round rods resting at their end portions on the lower ring and rigidly secured thereto, said bottom rods at their point of intersection being reversely bowed, and a bail-like handle having eyes at the outer ends through which the upper ring extends, the space between the adjacent upright rods being materially less than the diameter of the rack, the inner sides of the upright rods being smooth and continuous throughout their entire length, said rack having no projections inwardly of the inner sides of the upright rods.

REINO H. WUOLLET.

REFERENCES CITED

The following references are of record in the file of this patent:

UNITED STATES PATENTS

| Number | Name | Date |
|---|---|---|
| D. 110,146 | Hume | June 21, 1938 |
| 463,811 | Kohn | Nov. 24, 1891 |
| 1,091,907 | Benners | Mar. 31, 1914 |
| 1,337,010 | Frey | Apr. 13, 1920 |
| 1,362,933 | Ferdon | Dec. 21, 1920 |
| 1,453,942 | Mills | May 1, 1923 |
| 1,459,184 | Morton | June 19, 1923 |
| 1,807,587 | Copeman | June 2, 1931 |